Jan. 24, 1950 W. D. VAUGHN ET AL 2,495,647
BALED HAY LOADING MACHINE
Filed May 7, 1946 3 Sheets-Sheet 2
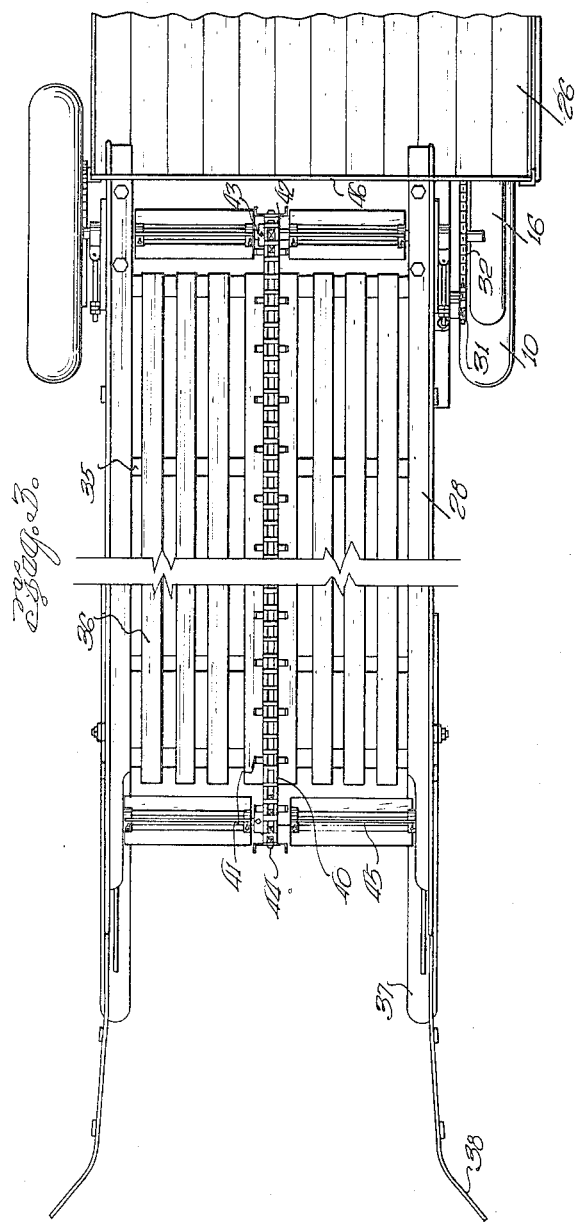
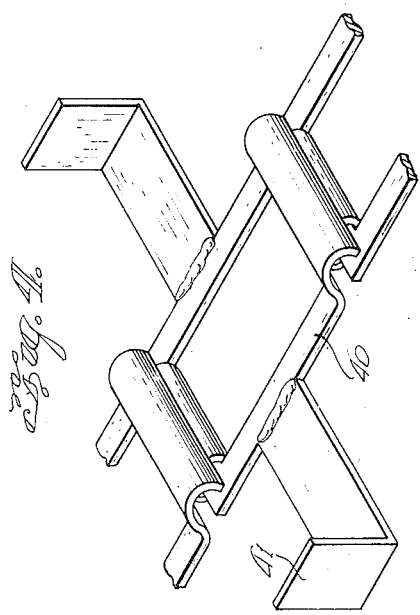
WESLEY D. VAUGHN
THOMAS O. VAUGHN
INVENTOR.
ATTORNEY Jan. 24, 1950 W. D. VAUGHN ET AL 2,495,647
BALED HAY LOADING MACHINE
Filed May 7, 1946 3 Sheets-Sheet 3

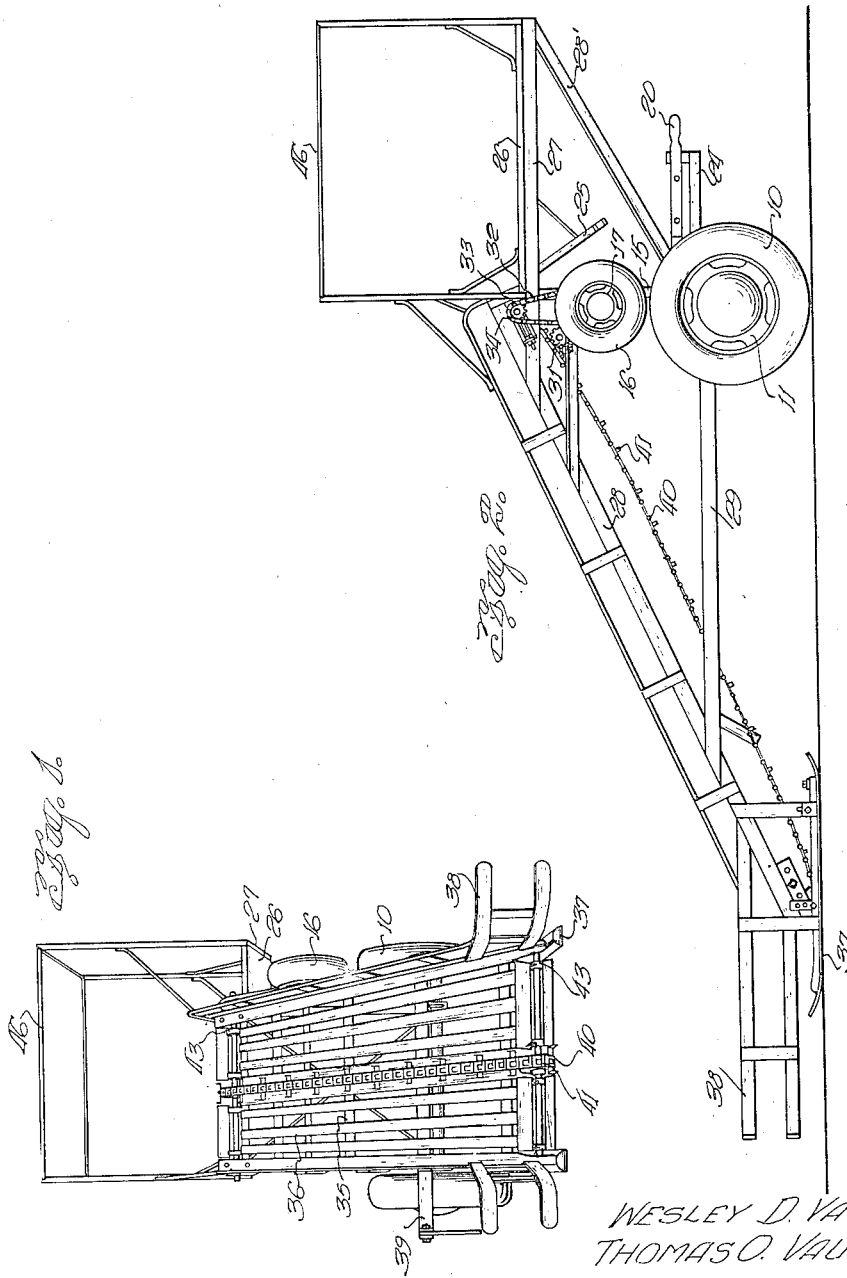

WESLEY D. VAUGHN
THOMAS O. VAUGHN
INVENTOR.

BY
ATTORNEY

Patented Jan. 24, 1950

2,495,647

UNITED STATES PATENT OFFICE 2,495,647

BALED HAY LOADING MACHINE

Wesley D. Vaughn and Thomas O. Vaughn, Vernon, Tex.

Application May 7, 1946, Serial No. 667,852

2 Claims. (Cl. 198—11)

This invention relates to baled hay loading devices and more particularly to such devices of a mechanical nature capable of moving or lifting hay in bales to a position from which it may be placed within or upon a wagon, truck, or other means of transportation.

The principal object of the invention is to provide a means for lifting hay in bales from the ground to an elevated platform by means of a continuous chain having a series of perpendicular lugs capable of engaging the bales for a movement up an inclined passage. The usual procedure followed in loading baled hay entails the use of hay hooks wielded manually to engage and lift the bales from the ground to a position upon a conveyance or within the reach of another workman using a similar hook. The embodiment of this invention eliminates the initial manual displacement of baled hay, placing it within easy reach of a workman for loading.

Another object of the invention is to provide means for engagement and disengagement of the driving mechanism connecting with the continuous chain used in moving the hay in bales from the ground to an elevated platform.

Still another object of the invention is to provide means for attachment of the invention in parallel alignment with a conveyance for movement in unison therewith.

With the foregoing objects as paramount, the invention has further reference to certain features of accomplishment, which will become apparent as the description proceeds, taken in connection with the accompanying drawings, wherein:

Figure 1 is a front perspective view of a machine used in loading hay in bales upon a truck or other means of transportation constructed according to the invention.

Figure 2 is a side elevational view of the invention.

Figure 3 is a fragmentary top plan view of the invention.

Figure 4 is a fragmentary perspective view of a continuous chain to illustrate the relative position of the perpendicularly extending lugs placed at predetermined intervals to engage hay in bales to move said hay upward along a chute provided therefor.

Figure 5:
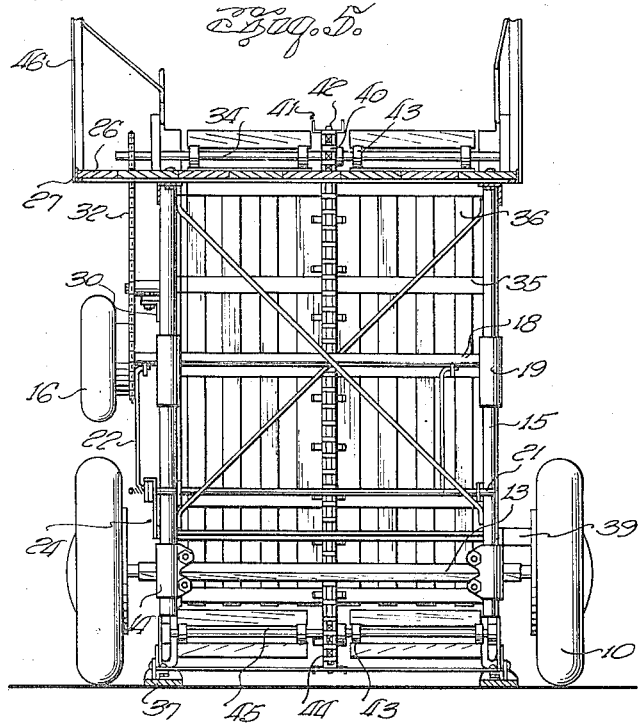
Figure 5 is a rear elevational view of the invention, shown partially in section.

Continuing with a more detailed description of the drawings, it will be noted that the rear portion of the machine is supported upon pneumatic tires 10 mounted on wheel 11 which are in turn mounted on an axle 12 enclosed in a housing member 13. A pair of tubular clamping members 14 are affixed adjacent the ends of the housing member 13 and are capable of slidable adjustment vertically upon concentric supporting members 15 for mutual bearing engagement between one of the tires 10 and a similar tire 16 of smaller diameter mounted on a wheel 17 and axle 18 affixed to slidable tubular members 19 on the supporting members 15. Displacement of the tire 16 for engagement with the tire 10 is accomplished by means of a lever 20 secured in the position indicated in Figure 6. Similarly, disengagement is achieved by displacement and securement of the lever 20 in the position shown in Figure 2 and indicated by dash lines in Figure 6. The lever 20 is pivoted on a shaft 21 and is connected with the axle 18 by means of a rod 22 acting upon a plate 23 affixed subjacent the axle 18. A horizontal locking arm 24 is affixed to the supporting member 15 and has a laterally extending protuberance capable of retaining the lever 20 rigidly in position. A rigid arm 25 is affixed to and extends angularly downward from an elevated platform 26 and has two laterally extending plates on its lower end, between which is received and retained the lever 20 when the latter is raised to correspondingly lower the wheel 16 into engagement with wheel 10 to operate the incline conveyor chain to be presently described.

The platform 26 is supported upon a frame 27 constructed of angle iron affixed to the supporting members 15. Angular braces 28' extend from the rear of the frame 27 to a point of rigid attachment near the lower end of the supporting members 15 and serve to maintain the elevated platform 26 securely in its horizontal position.

Figure 6:
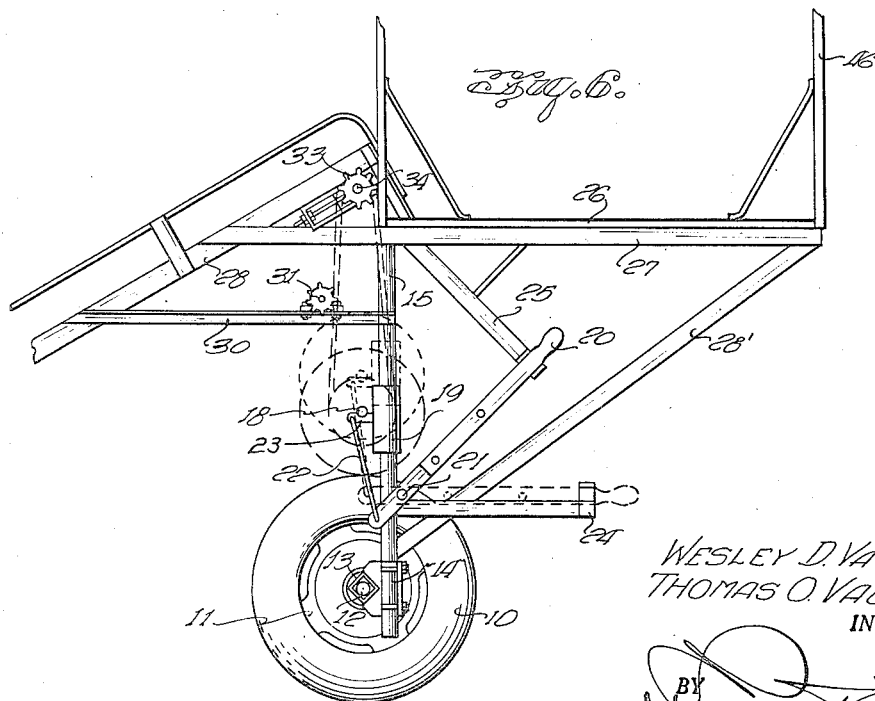
Figure 6 is a fragmentary side elevational view of the rear portion of the invention to illustrate the means provided for engagement and disengagement of the continuous hay displacing means.

The side members of the frame 27 extend past the supporting members 15 to a point of juncture and attachment with an inclined chute frame 28. In like manner a horizontal member 29 extends horizontally from the supporting members 15 near their lower ends to the frame 28 near the front of the machine. A similar horizontal member 30 is affixed to the frame 28 and a supporting member 15, as shown in Figure 6, and serves as a mounting for an idler sprocket wheel 31 which engages a chain 32. The wheel 17 has a sprocket wheel affixed thereon to engage the chain 32 for the purpose of transmitting rotation of the wheel 17 to a sprocket wheel 33 mounted on an axle 34, an operation which will be more fully described hereinafter.

To the frame 28 is affixed a plurality of lateral members 35 which maintain said frame 28 in parallelism and serve to support a series of spaced flat members 36 in alignment with the frame 28 forming the bed of an inclined chute. The lower end of the frame 28 is supported upon a pair of ground engaging skids 37 while a pair of outwardly curving side rails 38 serve to guide the baled hay onto the lower end of the chute as the machine is moved forward. A fixed arm 39 extends laterally from a supporting member 15 and is adapted for attachment to a truck or other conveyance to provide means for moving the machine in unison with said conveyance.

A detachable-link conveyor chain 40, shown in detail in Figure 4, forms means for moving baled hay up the chute, a series of lugs 41 being affixed at predetermined intervals along the continuous chain 40 to securely engage individual bales as the machine is moved forward in the process of loading. The chain 40 is operated by a sprocket 42 mounted on the axle 34 which is actuated by the rotational movement of the sprocket 32. Standard bearings 43 support the axle 34. A sprocket 44 mounted on a shaft 45, laterally disposed at the lower end of the chute formed by the frame 28 and its component members, supports the chain 40 in its operating position. A superstructure 46 integrally affixed at the frame 27 forms a partial enclosure for the platform 26.

In operation as a baled hay loader the machine is attached by means of the fixed arm 39 to a wagon, truck, or other conveyance and moves in unison with said conveyance. As the machine moves forward the bales of hay lying on the ground are guided into engagement with the lugs 41 on the chain 40 by the outwardly curving side rails 38. The lever 20 is locked in the position illustrated in Figure 6 thus placing the tire 16 into firm engagement with the tire 10 thereby causing the chain 32 to transmit rotational motion to the axle 34 and the sprocket 42, which action in turn actuates the continuous chain 40. As the chain 40 moves upward along the chute the lugs 41 engage a bale and convey it to the elevated platform 26. In position upon the platform 26, the bale is within easy reach of a workman on the deck of the conveyance, or a workman may stand upon the platform 26 and lift the bale across to the conveyance to be stacked in place by another workman.

Manifestly, the construction as shown and described is capable of some modification, and such modification as may be construed to fall within the scope and meaning of the appended claims is also considered to be within the spirit and intent of the invention.

What is claimed is:

1. A baled hay loading machine including a frame having wheels and provided with parallel uprights at the rear thereof, a platform supported by said uprights, an inclined endless conveyor for elevating bales of hay onto said platform, a collar slidable on each of said uprights, a shaft whose ends are journaled in bearings carried by said collars and movable therewith, a wheel mounted on one end of said shaft for movement into and out of engagement with the tread of a wheel of said frame, a pivoted lever for raising and lowering said shaft to move the wheel thereon into and out of engagement with said frame wheel and means providing operative connection between said first wheel and said conveyor for actuating the latter when said wheels are in engagement.

2. A baled hay loading machine including a wheeled frame, a pair of uprights on said frame, a platform supported by said uprights, means for elevating baled hay from the ground onto said platform, a collar slidably mounted on each of said uprights, a shaft supported at its ends by said collars, a wheel mounted on said shaft, a lever for raising and lowering said shaft to move said wheel into and out of frictional engagement with the tread of one of the wheels of said frame and means for transmitting motion from said first wheel to said elevating means when said wheels are in frictional engagement and while said machine is in motion.

WESLEY D. VAUGHN.
THOMAS O. VAUGHN.

REFERENCES CITED

The following references are of record in the file of this patent:

UNITED STATES PATENTS

| Number | Name | Date |
| --- | --- | --- |
| 2,096,910 | McIntosh | Oct. 26, 1937 |
| 2,174,605 | Spencer | Oct. 3, 1939 |
| 2,400,086 | Hansen | May 14, 1946 |
| 2,402,465 | Templeton | June 18, 1946 |
| 2,408,863 | Lisota | Oct. 8, 1946 |